(12) United States Patent
Jiang et al.

(10) Patent No.: US 8,451,978 B2
(45) Date of Patent: *May 28, 2013

(54) AUTOMATED DSL PERFORMANCE ADJUSTMENT

(75) Inventors: Baofeng Frank Jiang, Pleasanton, CA (US); Xidong Wu, Livermore, CA (US); Jim Tidashi Otsuka, San Jose, CA (US); John Porter Van Slyke, Lafayette, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/035,283

(22) Filed: Feb. 25, 2011

(65) Prior Publication Data

US 2011/0142206 A1 Jun. 16, 2011

Related U.S. Application Data

(63) Continuation of application No. 11/890,995, filed on Aug. 7, 2007, now Pat. No. 7,920,677, which is a continuation of application No. 10/761,123, filed on Jan. 20, 2004, now Pat. No. 7,272,209.

(51) Int. Cl.
*H04M 1/24* (2006.01)
*H04M 3/08* (2006.01)
*H04M 3/22* (2006.01)

(52) U.S. Cl.
USPC ......... 379/1.04; 379/1.03; 379/24; 379/29.09

(58) Field of Classification Search
USPC ............... 379/1.01, 1.03, 1.04, 22, 24, 26.01, 379/27.04, 28, 29.09; 375/224, 230
See application file for complete search history.

(56) References Cited

U.S. PATENT DOCUMENTS

| | | | |
|---|---|---|---|
| 5,751,338 A | 5/1998 | Ludwig |
| 5,974,139 A | 10/1999 | McNamara |
| 5,987,061 A | 11/1999 | Chen |
| 6,044,107 A | 3/2000 | Gatherer |
| 6,055,268 A | 4/2000 | Timm |
| 6,081,291 A | 6/2000 | Ludwig |
| 6,292,559 B1 | 9/2001 | Gaikwad |

(Continued)

OTHER PUBLICATIONS

International Search Report and Written Opinion of the International Searching Authority for International Application No. PCT/US04/42840, Mailed on March 7, 2007.

(Continued)

*Primary Examiner* — Quoc D Tran
(74) *Attorney, Agent, or Firm* — Toler Law Group, PC

(57) ABSTRACT

A method includes selecting a first set of digital subscriber lines (DSLs) supported by a digital subscriber line access multiplexor (DSLAM). The DSLs of the first set exhibit reduced performance based on historical performance data. The method includes sending a request to the DSLAM for a first performance parameter for each of the DSLs of the first set. The method includes receiving the first performance parameters. The method includes removing DSLs from the first set that have suitable performance based on the first performance parameters to create a second set of DSLs. The method includes selecting a line profile to apply to the second set of DSLs. The method also includes sending a second request to the DSLAM to apply the line profile to the DSLs of the second set and then to determine a second performance parameter for each of the DSLs of the second set.

20 Claims, 3 Drawing Sheets

U.S. PATENT DOCUMENTS

| | | | |
|---|---|---|---|
| 6,317,495 B1 | 11/2001 | Gaikwad | |
| 6,424,657 B1 | 7/2002 | Voit | |
| 6,466,088 B1 | 10/2002 | Rezvani | |
| 6,467,092 B1 | 10/2002 | Geile | |
| 6,477,238 B1 | 11/2002 | Schneider | |
| 6,498,791 B2 | 12/2002 | Picket | |
| 6,507,606 B2 | 1/2003 | Shenoi | |
| 6,532,277 B2 | 3/2003 | Ulanskas | |
| 6,538,451 B1 | 3/2003 | Galli | |
| 6,549,568 B1 | 4/2003 | Bingel | |
| 6,570,855 B1 | 5/2003 | Kung | |
| 6,597,689 B1 | 7/2003 | Chiu | |
| 6,608,835 B2 | 8/2003 | Geile | |
| 6,614,781 B1 | 9/2003 | Elliott | |
| 6,625,255 B1 | 9/2003 | Green | |
| 6,640,239 B1 | 10/2003 | Gidwani | |
| 6,643,266 B1 | 11/2003 | Pugaczewski | |
| 6,658,052 B2 | 12/2003 | Krinsky | |
| 6,667,971 B1 | 12/2003 | Modarressi | |
| 6,668,041 B2 | 12/2003 | Kamali | |
| 6,674,725 B2 | 1/2004 | Nabkel | |
| 6,674,749 B1 | 1/2004 | Mattathil | |
| 6,680,940 B1 | 1/2004 | Lewin | |
| 6,697,768 B2 | 2/2004 | Jones | |
| 6,700,927 B1 | 3/2004 | Esliger | |
| 6,724,859 B1 | 4/2004 | Galli | |
| 6,728,238 B1 | 4/2004 | Long | |
| 6,731,678 B1 | 5/2004 | White | |
| 6,735,601 B1 | 5/2004 | Subrahmanyam | |
| 6,751,218 B1 | 6/2004 | Hagirahim | |
| 6,751,315 B1 | 6/2004 | Liu | |
| 6,751,662 B1 | 6/2004 | Natarajan | |
| 6,754,283 B1 | 6/2004 | Li | |
| 6,762,992 B1 | 7/2004 | Lemieux | |
| 6,763,025 B2 | 7/2004 | Leatherbury | |
| 6,765,864 B1 | 7/2004 | Natarajan | |
| 6,765,918 B1 | 7/2004 | Dixon | |
| 6,769,000 B1 | 7/2004 | Akhtar | |
| 6,769,024 B1 | 7/2004 | Natarajan | |
| 6,771,673 B1 | 8/2004 | Baum | |
| 6,775,232 B1 | 8/2004 | Ah Sue | |
| 6,775,267 B1 | 8/2004 | Kung | |
| 6,775,268 B1 | 8/2004 | Wang | |
| 6,775,273 B1 | 8/2004 | Kung | |
| 6,778,525 B1 | 8/2004 | Baum | |
| 6,782,082 B2 | 8/2004 | Rahamim | |
| 6,819,746 B1 | 11/2004 | Schneider | |
| 6,914,961 B2 | 7/2005 | Holeva | |
| 6,985,444 B1 | 1/2006 | Rosen | |
| 7,106,833 B2 | 9/2006 | Kerpez | |
| 7,162,011 B2 | 1/2007 | Kolligs | |
| 7,272,209 B2 * | 9/2007 | Jiang et al. | 379/1.04 |
| 7,920,677 B2 * | 4/2011 | Jiang et al. | 379/1.04 |
| 2002/0057763 A1 | 5/2002 | Sisk | |
| 2004/0095921 A1 | 5/2004 | Kerpez | |
| 2005/0141673 A1 | 6/2005 | Lunt | |
| 2007/0274458 A1 | 11/2007 | Jiang | |

OTHER PUBLICATIONS

International Telecommunication Union, "Series G: Transmission Systems and Media Digital Systems and Networks. Digital Sections and Digital Line System-Access Networks. Asymetric Digital Subscriber Line (ADSL) Transceivers-2(ADSL2)," G.992.3, ITU-T, Jul. 2002, pp. 1-127.

Non-Final Office Action for U.S. Appl. No. 10/761,123, mailed Feb. 9, 2007, 11 pages.

Office Action (*Ex Parte Quayle*) for U.S. Appl. No. 11/890,995, mailed Aug. 26, 2010, 14 pages.

Notice of Allowance and Fee(s) Due for U.S. Appl. No. 10/761,123, mailed Jul. 12, 2007, 4 pages.

Notice of Allowance and Fee(s) Due for U.S. Appl. No. 11/890,995, mailed Dec. 14, 2010, 6 pages.

* cited by examiner

AUTOMATED DSL PERFORMANCE ADJUSTMENT

PRIORITY CLAIM

This application is a continuation of and claims priority from U.S. patent application Ser. No. 11/890,995 filed on Aug. 7, 2007 and now issued as U.S. Pat. No. 7,920,677, which is a continuation of and claims priority from U.S. patent application Ser. No. 10/761,123 filed on Jan. 20, 2004 and now issued as U.S. Pat. No. 7,272,209. The contents of U.S. patent application Ser. No. 11/890,995 and U.S. patent application Ser. No. 10/761,123 are expressly incorporated herein by reference in their entirety.

FIELD OF THE DISCLOSURE

The present disclosure relates generally to an automated method of adjusting digital subscriber line (DSL) performance and an automated DSL performance control system.

BACKGROUND

Digital subscriber lines (DSL), such as ADSL lines, are configured to particular profiles based on service agreement, loop quality, and operating environment. A change in these factors, such as introduction of outside electro-magnetic noise, degrades line performance. If the degradation is serious, the line may become a "problem line" and need a new profile. With a large network, there may be thousands of DSL lines that become problem lines. The typical system to make profile adjustments is to have a service technician manually change the DSL line profile in response to customer complaints received at a volume call center. This process may involve one or more truck rolls (sending a service technician to a customer site) which leads to increased DSL maintenance and service costs. It would be desirable to reduce the costs associated with DSL line maintenance while providing improved DSL line performance.

DETAILED DESCRIPTION

In a particular embodiment, the present application discloses an automated digital subscriber line performance control system comprising a computer system including a logic module to evaluate performance of a plurality of DSL lines and to automatically select a set of DSL lines from the plurality of DSL lines, a line profile database responsive to the computer system, the line profile database providing a plurality of line profiles in response to a request from the computer system, and a digital subscriber line access multiplexer coupled to the computer system. The digital subscriber line access multiplexer is configured to measure a performance parameter of a plurality of physical DSL lines and to change a profile for at least one of the plurality of DSL lines. The set of DSL lines has degraded performance characteristics based on historical performance data.

In another embodiment, an automated method of adjusting digital subscriber line (DSL) performance is disclosed. The method includes evaluating performance of a plurality of DSL lines; automatically selecting a set of DSL lines from the plurality of DSL lines, the set of DSL lines having degraded performance characteristics based on historical performance data measuring a performance parameter for each of the set of DSL lines; removing from the set of DSL lines any DSL lines that have suitable performance based on the measured performance parameter to create a revised set of DSL lines with degraded performance; and applying one of a plurality of line profiles to each of the physical DSL lines identified by the revised set of DSL lines.

Figure 1:
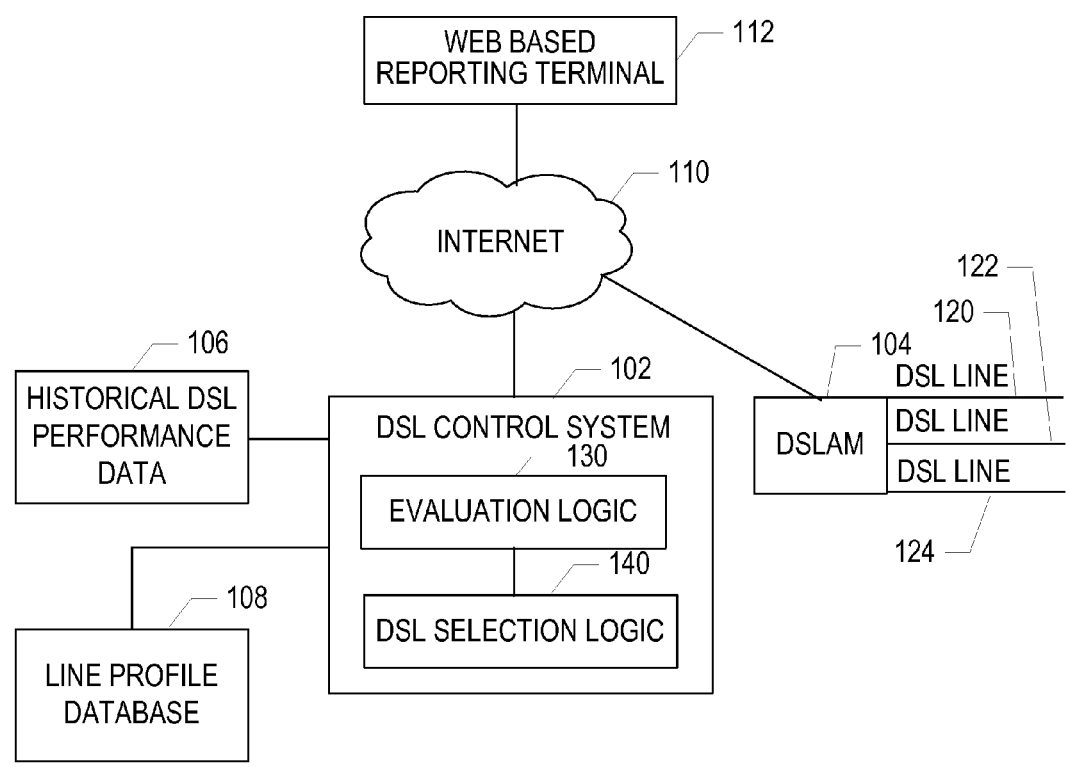
FIG. 1 is a block diagram of a DSL network and a DSL control system.

Referring to FIG. 1, a system in accordance with an embodiment of the present invention is illustrated. The system includes a digital subscriber line (DSL) control system 102, an internet network core 110, and a digital subscriber line access multiplexor (DSLAM) 104. The system also includes a line profile database 108 and a historical DSL performance database 106 coupled to the DSL control system 102. In addition, the system includes a remote web-based reporting terminal 112 coupled to the internet 110. The DSLAM 104 is connected to the internet 110 and connects to a plurality of DSL lines 120 such as illustrated DSL lines 120, 122, and 124. The DSL control system 102 includes evaluation logic 130 and DSL line selection logic 140.

The DSL control system 102 may be implemented as a computer system that includes software to execute the evaluation logic 130 and the DSL selection logic 140. The web-based reporting terminal 112 may be a computer workstation, or personal computer with a display device that includes an input device and a computer processor. An example is a computer workstation that may be operated by a user for viewing reports as to DSL network performance and statistics. The DSL performance database 106 and the line profile database 108 may be implemented with standard computer database technology.

Figure 2:
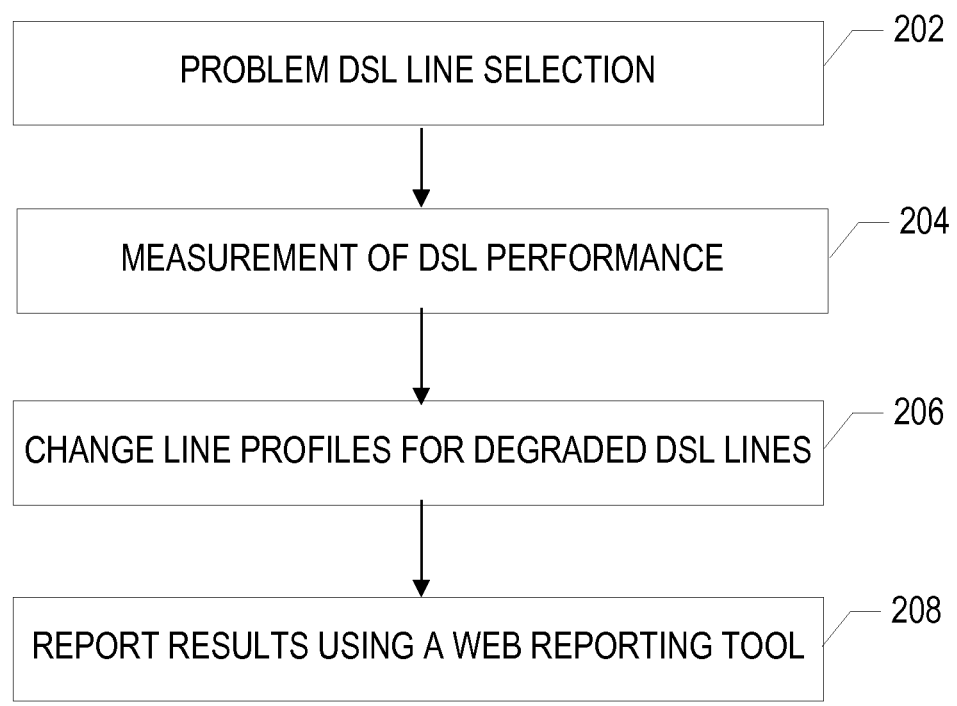
FIG. 2 is a flowchart of an illustrative method of adjusting DSL line performance.

Referring to FIG. 2, operation of the system illustrated in FIG. 1 is described. At step 202, a problem DSL line selection is made. For example, historical DSL performance data for various DSL lines supported by the DSLAM 104 may be evaluated to determine those DSL lines that have reduced performance or performance below a defined performance threshold. In this manner, one or more problem DSL lines may be selected. Selection logic to determine and evaluate the historical DSL performance data may be performed, such as by using the DSL selection logic unit 104 within the DSL control system 102. DSL performance for various lines is measured, at step 204. This step may be performed on all DSL lines or may be performed just on the reduced set of DSL lines that are identified as problem lines. The measurement of DSL performance made on selected problem lines is performed to confirm that the problem DSL line status through an additional measurement.

Line profiles for the degraded DSL lines are changed, at step 206. For example, the DSL lines that were initially selected, at step 202, and then verified as having performance problems at step 204, would have their line profiles changed, at step 206. An example of a changed line profile includes a change to a reduced speed profile or to a channel interleaved profile to assist the performance of the problem DSL line selected. A report of the results of problem DSL lines is provided using a web-reporting tool, at 208. For example, a performance measurement of the DSL line may be taken after the profile has been changed. The performance of selected problem DSL lines may be reported both before and after the profile change. A display report may be reported to an operator, such as via the remote web-based reporting terminal 112. In this matter, an operator of a network may observe performance measurements for problem DSL lines and may observe and evaluate those problem DSL lines before and after a change of profile has been made.

Figure 3:
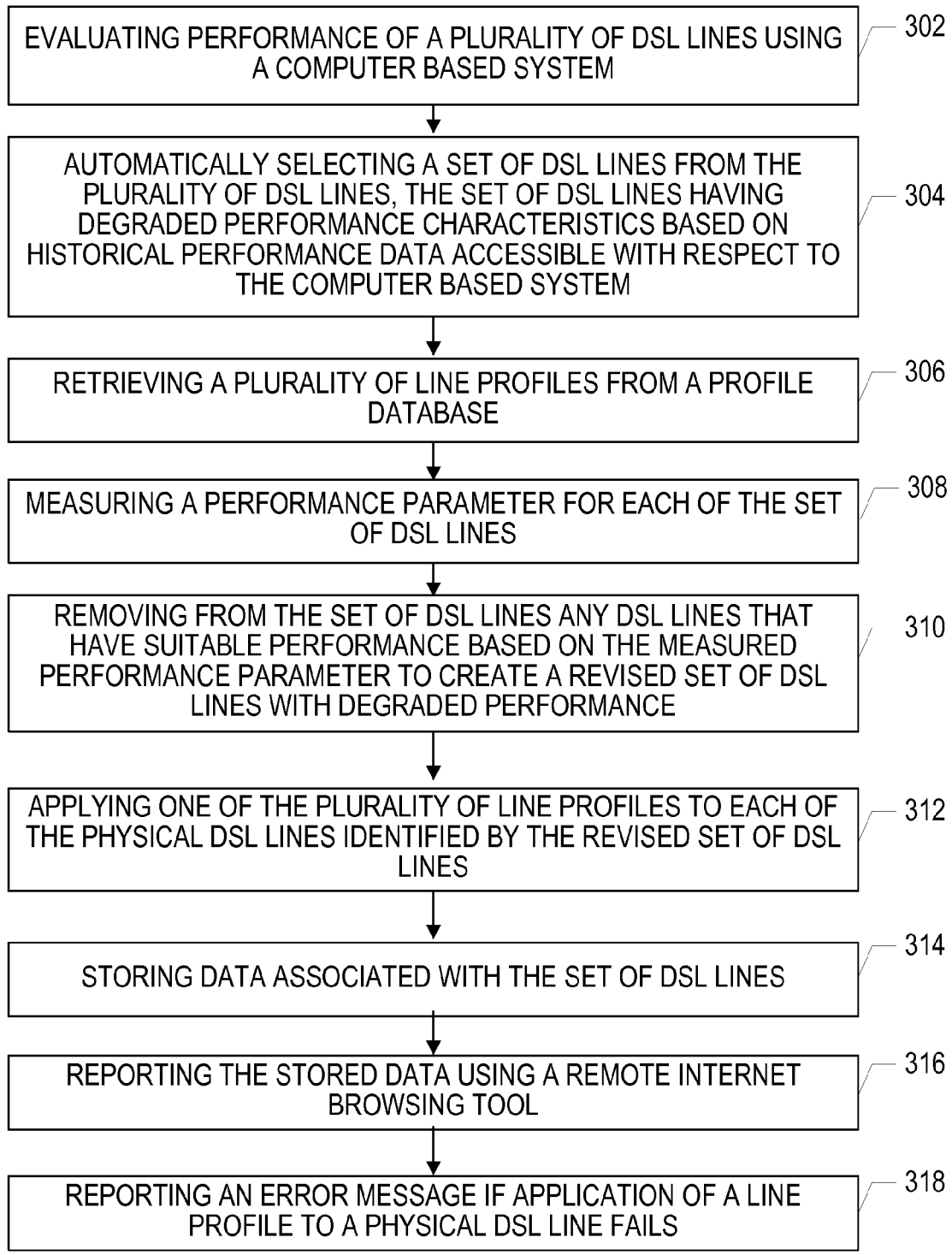
FIG. 3 is a flowchart of a detailed method of adjusting DSL line profiles.

Referring to FIG. 3, a further detailed flow chart that illustrates operation of the system of FIG. 1 is shown. Performance of the plurality of DSL lines is evaluated using a computer-based system, at step 302. An example of such a computer-based system would be the DSL control system 102. The set of DSL lines is automatically selected from a plurality of available DSL lines, at step 304. The set of DSL lines having degraded performance characteristics may be determined based on historical performance data that is accessible to the computer-based system, as shown at step 304. For example, historical DSL performance data 106 may be evaluated by the DSL selection logic 104 within the DSL control system 102, with respect to a set of DSL lines supported by DSLAM 104.

A plurality of line profiles is then retrieved from a profile database, at step 306, and a performance parameter for each of the DSL lines is then measured, at step 308. A subset of DSL lines that have suitable performance based on the measured performance parameter are then removed from the set of degraded DSL lines, at step 310. The result of this step is a revised and reduced size set of DSL lines that have confirmed degraded performance, also shown at step 310. A line profile is then applied to each of the physical DSL lines that are identified by the revised set of DSL lines, at step 312. For example, a reduced speed profile or an interleaved profile would be applied to each of the physical DSL lines that are identified by the revised set of DSL lines, at step 312. Data associated with the revised set of DSL lines is then stored, at 314. An example of such data would be performance data measured after application of the new line profile to the DSL lines. The stored data is then reported, such as by using a remote internet browsing tool, at step 316. At step 318, an error message is reported if application of the profile to a physical DSL line fails. For example, where a new line profile is attempted to be applied to a physical DSL line and that new line profile is unable to be applied, an error message could be reported at the web-based reporting terminal 112. The error report provides for operator awareness and allows subsequent action to be taken by the operator.

The system and method illustrated with respect to FIGS. 1-3 above, discloses an automated system and may be used with many DSL lines and multiple DSLAM units in a deployed network. With this automated system, thousands of lines may be measured and adjusted automatically, including periodically or on a scheduled basis. With automated adjustments, human intervention is either not needed or, is significantly reduced. The processing time to measure and adjust each DSL line typically uses less than one minute of computer time. The same operation performed by a service technician manually, could take half an hour or longer, depending on the skill of the technician and the complexity of the DSL problem. In addition, using manual service technicians may result in one or more truck rolls adding further cost to DSL maintenance in the network.

The disclosed system utilizes automated methods and provides for improved DSL line performance. In addition, the system removes a significant level of human influence in the process and provides for enhanced performance at a lower cost. Further, line profile adjustment is often a difficult and error prone process and is well-suited to an automated computer control technique as shown.

In addition, with traditional manual methods, only those problem lines identified by customer calls would get attention. In the disclosed system, many problem lines are detected automatically and profiles may be automatically corrected to prevent these problem customer calls. Thus, customer service and DSL line performance is improved while maintenance costs are further reduced. In this manner, not only are customer complaints taken care of expeditiously, but many problems are fixed where neither the company nor the customer have been formally identified, thus, preventing potential subscriber losses. In addition, using a web-based reporting terminal, reports may be generated that include information, such as a list of problem lines selected, lines that fail in the adjustment process, lines that are adjusted successfully, and a line performance matrix that shows performance before and after the line profile has been applied. Thus, a useful reporting tool for network operators is also provided.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    selecting a first set of digital subscriber lines supported by a digital subscriber line access multiplexor with a computer system, wherein each digital subscriber line of the first set exhibits reduced performance based on historical performance data;
    sending a request to the digital subscriber line access multiplexor from the computer system for a first performance parameter for each digital subscriber line of the first set of digital subscriber lines;
    receiving the first performance parameter for each digital subscriber line of the first set of digital subscriber lines at the computer system;
    removing digital subscriber lines from the first set of digital subscriber lines that have suitable performance based on the first performance parameter of each of the digital subscriber lines to create a second set of digital subscriber lines with the computer system;
    selecting a line profile to apply to the second set of digital subscriber lines with the computer system; and
    sending a second request to the digital subscriber line access multiplexor from the computer system to apply the line profile to the digital subscriber lines of the second set of digital subscriber lines and then to determine a second performance parameter for each digital subscriber line of the second set of digital subscriber lines.

2. The method of claim 1, further comprising receiving the historical performance data from a database.

3. The method of claim 1, further comprising receiving a plurality of line profiles from a database.

4. The method of claim 1, further comprising receiving information for each digital subscriber line of the second set of digital subscriber lines.

5. The method of claim 4, wherein the information for a particular digital subscriber line of the second set of digital subscriber lines includes the second parameter when the digital subscriber line access multiplexor is able to apply the line profile to the particular digital subscriber line, and wherein the information includes an error indication when the digital subscriber line access multiplexor is not able to apply the line profile to the particular digital subscriber line.

6. The method of claim 1, further comprising sending a report to a terminal.

7. The method of claim 6, wherein the report includes a matrix that shows performance before and after application of the line profile, information that identifies the second set of digital subscriber lines, information that identifies digital subscriber lines that have unsuitable performance after application of the line profile, and information that identifies digital subscriber lines that have suitable performance after application of the line profile.

8. A system comprising:
a computer system coupled to a digital subscriber line access multiplexor, the computer system operable to:
evaluate historical performance data of digital subscriber lines supported by the digital subscriber line access multiplexor to determine a first set of digital subscriber lines with reduced performance;
send the digital subscriber line access multiplexor a first request to receive a first performance parameter for each digital subscriber line of the first set of digital subscriber lines;
remove at least one digital subscriber line from the first set of digital subscriber lines of digital subscriber lines that have suitable performance based on the first performance parameter corresponding to the at least one digital subscriber line to create a second set of digital subscriber lines;
select a line profile to apply to each digital subscriber line of the second set of digital subscriber lines; and
send a second request to the digital subscriber line access multiplexor to apply the line profile to each digital subscriber line of the second set of digital subscriber lines and to determine a second performance parameter for each digital subscriber line of the second set of digital subscriber lines after application of the line profile.

9. The system of claim 8, further comprising the digital subscriber line access multiplexor.

10. The system of claim 8, further comprising a database coupled to the computer system.

11. The system of claim 10, wherein the database comprises historical digital subscriber line performance data.

12. The system of claim 10, wherein the database comprises a line profile database.

13. The system of claim 8, wherein the computer system is further operable to receive information about each digital subscriber line of the second set of digital subscriber lines after the second request is sent, wherein the information for a particular digital subscriber line includes the second parameter when the digital subscriber line access multiplexor is able to apply the line profile to the particular digital subscriber line, and wherein the information includes an error indication when the digital subscriber line access multiplexor is not able to apply the line profile to the particular digital subscriber line.

14. The system of claim of claim 8, wherein the computer system is further operable to provide a report to a terminal.

15. A method comprising:
receiving identification information for a first set of digital subscriber lines at a digital subscriber line access multiplexor from a control system;
measuring a first performance parameter for each digital subscriber line of the first set of digital subscriber lines with the digital subscriber line access multiplexor;
receiving identification information at the digital subscriber line access multiplexor for a second set of digital subscriber lines from the control system, wherein the second set of digital subscriber lines includes digital subscriber lines of the first set of digital subscriber lines having first performance parameters that indicate unsuitable performance;
applying a line profile received from the control system to each digital subscriber line identified in the second set of digital subscriber lines with the digital subscriber line access multiplexor; and
measuring a second performance parameter for each digital subscriber line of the second set of digital subscriber lines with the digital subscriber line access multiplexor.

16. The method of claim 15, further comprising sending the first performance parameter for each digital subscriber line of the first set of digital subscriber lines to the control system.

17. The method of claim 15, further comprising sending the second performance parameter for each digital subscriber line of the second set of digital subscriber lines to the control system.

18. The method of claim 15, further comprising sending an error indication to the control system for a particular digital subscriber line when application of the line profile to each digital subscriber line identified in the second set of digital subscriber lines fails.

19. The method of claim 15, wherein applying the line profile changes an initial line profile to a reduced speed profile.

20. The method of claim 15, wherein applying the line profile changes an initial line profile to a channel interleaved profile.

* * * * *